United States Patent
Patronas et al.

(10) Patent No.: US 12,015,533 B2
(45) Date of Patent: Jun. 18, 2024

(54) SYSTEM FOR MACHINE LEARNING (ML) BASED NETWORK RESILIENCE AND STEERING

(71) Applicant: Mellanox Technologies, Ltd., Yokneam (IL)

(72) Inventors: Ioannis (Giannis) Patronas, Piraeus (GR); Tamar Viclizki Cohen, Herzliya (IL); Vadim Gechman, Kibbutz Hulda (IL); Dimitrios Syrivelis, Volos (GR); Paraskevas Bakopoulos, Ilion (GR); Nikolaos Argyris, Zografou (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/956,035

(22) Filed: Sep. 29, 2022

(65) Prior Publication Data
US 2024/0098000 A1    Mar. 21, 2024

(30) Foreign Application Priority Data

Sep. 19, 2022    (GR) .............................. 2022/0100759

(51) Int. Cl.
*H04L 43/065*    (2022.01)
*H04L 41/16*    (2022.01)
(Continued)

(52) U.S. Cl.
CPC ............ *H04L 43/065* (2013.01); *H04L 41/16* (2013.01); *H04L 43/0817* (2013.01); *H04L 45/28* (2013.01)

(58) Field of Classification Search
CPC ... H04L 43/065; H04L 41/16; H04L 43/0817; H04L 45/28
See application file for complete search history.

(56) References Cited

U.S. PATENT DOCUMENTS

| 6,981,174 B1 * | 12/2005 | Hanning | H04L 12/4625 |
| | | | 714/4.11 |
| 2015/0304238 A1 * | 10/2015 | Brown | H04L 47/83 |
| | | | 370/235 |

(Continued)

FOREIGN PATENT DOCUMENTS

| EP | 1009192 A2 * | 6/2000 | ......... H04L 49/3081 |

OTHER PUBLICATIONS

"Credo Announces HiWire SWITCH AEC-Enabling Simpler Faster and More Reliable Dual TOR Connectivity", [online] Jul. 15, 2021. Retrieved from the internet <https://financialpost.com/pmn/press-releases-pmn/business-wire-news-releases-pmn/credo-announces-hiwire-switch-aec-enabling-simpler-faster-and-more-reliable-dual-tor-connectivity>.

(Continued)

*Primary Examiner* — Anh Nguyen
(74) *Attorney, Agent, or Firm* — Moore & Van Allen PLLC; Anup Iyer (57) ABSTRACT

Systems, computer program products, and methods are described herein for machine learning (ML) based system for network resilience and steering. An example system monitors data movement across one or more network ports; extracts network performance indicators associated with the data movement; determines, via a machine learning (ML) subsystem, that a status of a first network port is indicative of operational failure based on at least the network performance indicators; determines that the first network port is associated with a first network port cluster; determines a redundant network port and an intermediate network switch associated with the first network port cluster; and triggers the intermediate network switch to reroute a portion of network traffic from the first network port to the redundant (Continued)

network port in response to the status of the first network port.

20 Claims, 4 Drawing Sheets

(51) Int. Cl.
   *H04L 43/0817*   (2022.01)
   *H04L 45/28*     (2022.01)

(56) References Cited

U.S. PATENT DOCUMENTS

| | | | |
|---|---|---|---|
| 2019/0114877 A1* | 4/2019 | Hohman | A63F 13/35 |
| 2019/0165988 A1* | 5/2019 | Wang | H04L 41/064 |
| 2022/0173980 A1* | 6/2022 | Yoon | G06N 20/00 |

OTHER PUBLICATIONS

Mellette, W. et al., "P-FatTree: A Multi-channel Datacenter Network Topology", [online] HotNets '16: Proceedings of the 15th ACM Workshop on Hot Topics in Networks, Nov. 2016, pp. 78-84. Retrieved from the internet <https://doi.org/10.1145/3005745.3005746>.

Michelogiannakis, G. et al., "Bandwidth Steering in HPC Using Silicon Nanophotonics", [online] In Proceedings of the International Conference for High Performance Computing, Networking, Storage and Analysis, Nov. 17-22, 2019, Denver, CO., pp. 1-25. Retrieved from the internet <https://doi.org/10.1145/3295500.3356145>.

Minkenberg, C. et al., "Large-Scale System Partitioning using OCS," [online] 2015 International Conference on Photonics in Switching (PS), Florence, Italy, 2015, pp. 235-237. Retrieved from the internet <doi: 10.1109/PS.2015.7329011>.

Patronas, et al., pending U.S. Appl. No. 17/956,208, filed Sep. 29, 2022.

Patronas, et al., pending U.S. Appl. No. 17/964,367, filed Oct. 12, 2022.

Patronas, et al., pending U.S. Appl. No. 17/982,827, filed Nov. 8, 2022.

Patronas, et al., pending U.S. Appl. No. 17/982,895, filed Nov. 8, 2022.

Patronas, et al., pending U.S. Appl. No. 18/083,981, filed Dec. 19, 2022.

Dangi et al., pending U.S. Appl. No. 17/956,638, filed Sep. 29, 2022.

Clemons et al., pending U.S. Appl. No. 18/152,528, filed Jan. 10, 2023.

* cited by examiner

SYSTEM FOR MACHINE LEARNING (ML) BASED NETWORK RESILIENCE AND STEERING

CROSS-REFERENCE TO RELATED APPLICATIONS

This application claims priority to Greek Patent Application No. 2022/010,0759, filed Sep. 19, 2022, the entire contents of which application are hereby incorporated herein by reference.

TECHNOLOGICAL FIELD

Example embodiments of the present disclosure relate generally to network communications and, more particularly, to providing resilience for communications between network ports using machine learning techniques.

BACKGROUND

Modern communication networks often include a large number of interconnected network ports (e.g., switches, subports, optical modules, servers, hosts, and/or the like). These network ports strive to be consistently operational to maximize network throughput; however, network ports may fail at various times, due to malfunction, maintenance, and/or the like, causing reduced performance or unplanned downtime.

BRIEF SUMMARY

Applicant has identified a number of deficiencies and problems associated with network systems and associated communications. Through applied effort, ingenuity, and innovation, many of these identified problems have been solved by developing solutions that are included in embodiments of the present disclosure, many examples of which are described in detail herein. Systems, methods, and computer program products are therefore provided for machine learning based network resilience and steering. In one aspect, a machine learning (ML) based system for network resilience and steering is provided. The system may include a non-transitory storage device and a processor coupled to the non-transitory storage device. The processor may monitor data movement across one or more network ports and extracts network performance indicators associated with the data movement. The processor may further determine, via a machine learning (ML) subsystem, that a status of a first network port is indicative of operational failure based on at least the network performance indicators, determine that the first network port is associated with a first network port cluster, and determine a redundant network port and an intermediate network switch associated with the first network port cluster. The processor may further trigger the intermediate network switch to reroute a portion of network traffic from the first network port to the redundant network port in response to the status of the first network port.

In some embodiments, in triggering the intermediate network switch to reroute the portion of network traffic from the first network port to the redundant network port, the processor may trigger the intermediate network switch to terminate a communication link to the first network port.

In some embodiments, in determining that the status of the first network port is indicative of operational failure, the processor may further deploy, via the ML subsystem, a trained ML model on the network performance indicators extracted from the data movement and determine, using the trained ML model, a likelihood of failure for the first network port. In an instance in which the likelihood of failure for the first network port satisfies a failure threshold, the processor may further determine that the status of the first network port is indicative of operational failure In some embodiments, the processor may further monitor data movement across the one or more network ports for a first time period after triggering the rerouting of the portion of network traffic from the first network port to the redundant network port. The processor may determine, using the trained ML model, the likelihood of failure for the first network port and trigger the intermediate network switch to reroute the portion of network traffic from the redundant network port to the first network port in an instance in which the likelihood of failure of the first network port fails to satisfy the failure threshold.

In some embodiments, in triggering the intermediate network switch to reroute the portion of network traffic from the redundant network port to the first network port, the processor may further trigger the intermediate network switch to terminate a communication link to the redundant network port.

In some embodiments, the processor may further monitors data movement across the one or more network ports for a second time period, extract the network performance indicators associated with the data movement for the second time period, and determine. the status of the one or more network ports during the second time period. The processor may further generate a feature set using the network performance indicators and the status of the one or more network ports and train, using the ML subsystem, an ML model using the feature set to generate the trained ML model.

In some embodiments, prior to monitoring the data movement, the processor may supply a stimulus to the first network port cluster.

In another aspect, a computer program product for machine learning (ML) based network resilience and steering is provided. The computer program product may include a non-transitory computer-readable medium including code causing an apparatus to monitor data movement across one or more network ports, extract network performance indicators associated with the data movement, and determine, via a machine learning (ML) subsystem, that a status of a first network port is indicative of operational failure based on at least the network performance indicators. The non-transitory computer-readable medium including code causing the apparatus to determine that the first network port is associated with a first network port cluster, determine a redundant network port and an intermediate network switch associated with the first network port cluster, and trigger the intermediate network switch to reroute a portion of network traffic from the first network port to the redundant network port in response to the status of the first network.

In yet another aspect, a method for machine learning (ML) based network resilience and steering is provided. The method may include monitoring data movement across one or more network ports, extracting network performance indicators associated with the data movement, and determining, via a machine learning (ML) subsystem, that a status of a first network port is indicative of operational failure based on at least the network performance indicators. The method may further include determining that the first network port is associated with a first network port cluster, determining a redundant network port and an intermediate network switch associated with the first network port cluster, and triggering the intermediate network switch to reroute a portion of network traffic from the first network port to the redundant network port in response to the status of the first network.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

As described herein, network ports forming a network port pair may be referred to with reference to "input" and "output" network ports such that each network port pair includes a respective input network port and output network port. As such, the terms "input" and "output" are used merely for illustrative purposes in that the data, signals, information, and/or the like, that is transmitted by the network port pair may travel in either direction. In other words, an example input network port may operate as an output network port, and an example output network port may operate as an input network port. The present disclosure, therefore, contemplates that the network ports described herein may operate to transmit data, signals, and information to and receive data, signals, and information from any device communicably coupled thereto regardless of reference to input or output.

Furthermore, as would be evident to one of ordinary skill in the art in light of the present disclosure, the terms "substantially" and "approximately" indicate that the referenced element or associated description is accurate to within applicable engineering tolerances.

The embodiments of the present disclosure provide a system for network resilience and steering leveraging artificial intelligence (AI) and/or machine learning (ML) techniques. An example system may monitor data movement across various network ports and extract network performance indicators (e.g., bandwidth use, latency, error rate, and/or the like) and an operational status of each network port. The network performance indicators and the operational status of each network port may then be used as a feature set to train a machine learning model. Once trained, the machine learning model may be deployed on data movement across the network ports to preemptively identify network ports that are likely to fail. In response, the system may identify port clusters, the intermediate network switch for the port cluster, and/or the redundant port(s) or subports in the port cluster for each network port that is determined to have an increased likelihood of failure. The system may then subsequently trigger the intermediate network switches of the respective port cluster to re-route a portion of network traffic from the network ports that are likely to fail to their respective redundant ports or subports for continued operation.

Example Resiliency Systems

Figure 1A:
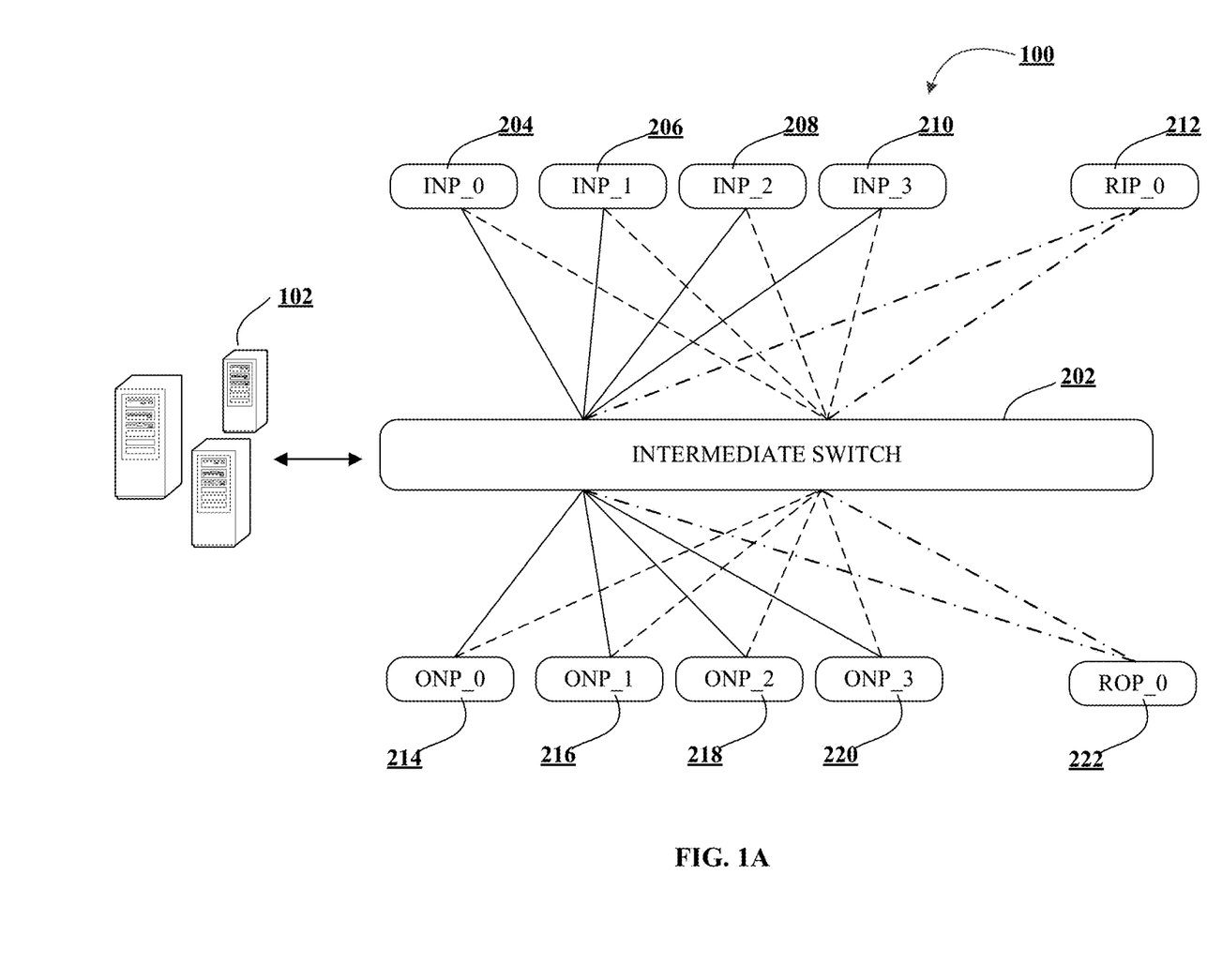
FIG. 1A illustrates an example network environment for a machine learning (ML) based system for network resilience and steering, in accordance with an embodiment of the present disclosure.

FIG. 1A illustrates an example network environment 100 for a machine learning (ML) based system for network resilience and steering. As shown in FIG. 1A, the network environment 100 may include a system 102, an intermediate network switch 202, a plurality of input network ports 204, 206, 208, 210, a plurality of output network ports 214, 216, 218, 220, a redundant input network port 212, and a redundant output network port 222. It is to be understood that the structure of the network environment 100 and its components, connections and relationships, and their functions, are meant to be exemplary only, and are not meant to limit implementations of the embodiments described and/or claimed in this document. In one example, the network environment 100 may include more, fewer, or different components. In another example, some or all of the portions of the network environment 100 may be combined into a single portion or all of the portions of the network environment 100 may be separated into two or more distinct portions.

The system 102 may be implemented in a number of different forms. For example, the system 102 may be implemented as a standard server, or multiple times in a group of such servers. Additionally, the system 102 may also be implemented as part of a rack server system or a personal computer such as a laptop computer. Alternatively, components from the system 102 may be combined with one or more other same or similar systems and an entire system 102 may be made up of multiple computing devices communicating with each other. The system 102 may represent various forms of servers, such as web servers, database servers, file server, or the like, various forms of digital computing devices, such as laptops, desktops, workstations, or the like, or any other auxiliary network devices, Internet-of-things devices, electronic kiosk devices, mainframes, or the like, or any combination of the aforementioned. In some examples, the system 102 may include, in whole or in part, the intermediate switch and/or the intermediate switch 202 may include, in whole or in part, the system 102.

The plurality of input network ports 204, 206, 208, 210 and the plurality of output network ports 214, 216, 218, 220 may refer to any networking device by, with, and/or through which data, signal, information, and/or the like may be communicated. As such, the plurality of input network ports 204, 206, 208, 210 and the plurality of output network ports 214, 216, 218, 220 may include any networking component or device, such as a switch, a server, a network interface controller (NIC), a networking card, a host, and/or the like. Communication between the plurality of input network ports 204, 206, 208, 210 and the plurality of output network ports 214, 216, 218, 220 may be facilitated by an intermediate network switch 202. In some embodiments, the input network port and the output network port in each network port pair may be the same type of network port (e.g., all of the network ports are switches). Alternatively, the input network port may be different in structure or operation than the output network port (e.g., the input network port may be an electrical switch and the output network port may be server).

The intermediate network switch 202 may be a hardware device that is operatively coupled to the plurality of input network ports 204, 206, 208, 210 and the plurality of output network ports 214, 216, 218, 220, and configured to facilitate and route communication therebetween. More specifically, the intermediate network switch 202 may facilitate and route communication between network port pairs formed by the plurality of input network ports 204, 206, 208, 210 and the plurality of output network ports 214, 216, 218, 220. As shown in FIG. 1A, these network port pairs may be INP_0 204 and ONP_0 214, INP_1 206 and ONP_1 216, INP_2 208 and ONP_2 218, and INP_3 210 and ONP_3 220. In some embodiments, the input network port (e.g., INP_0 204) and the output network port (e.g., ONP_0 214) of each network port pair (e.g., INP_0 and ONP_0) may be operatively coupled via the intermediate network switch 202 such that, when operational, the communications between the input network port and the output network port of the network port pair are directed via the intermediate network switch 202. In other embodiments, the input network port and the output network port may be operatively coupled separate from the intermediate network switch 202, and the intermediate network switch 202 may operate only to redirect communications in the event of a malfunction, as described hereinafter. In some embodiments, the intermediate network switch 202 may be an optical switch configured to route communication between network ports. While the intermediate network switch 202 is shown as a singular intermediate network switch in FIG. 1A, it is to be understood that various intermediate network switches may be used to operatively couple the plurality of input network ports 204, 206, 208, 210 and the plurality of output network ports 214, 216, 218, 220.

As shown in FIG. 1A, the network environment 100 may include a redundant input network port 212 and a redundant output network port 222 to provide resilience to the network environment 100 in the event that any of the plurality of input network ports 204, 206, 208, 210 or the plurality of output network ports 214, 216, 218, 220 malfunction (e.g., device failure, maintenance, and/or the like). To this end, the redundant input network port 212 and the redundant output network port 222 may be operatively coupled to the intermediate network switch 202. The redundant input network port 212 may operate to provide resiliency for any of the plurality of input network ports 204, 206, 208, 210, and the redundant output network port 222 may operate to provide resiliency for any of the plurality of output network ports 214, 216, 218, 220. Although the network environment 100 is illustrated as having two independent redundant ports 212, 222, one for the plurality of input network ports 204, 206, 208, 210, and another for the plurality of output network ports 214, 216, 218, 220, it is to be understood that a singular redundant network port (e.g., the redundant input network port 212 or the redundant output network port 222) may be leveraged by both the plurality of input network ports 204, 206, 208, 210, and the plurality of output network ports 214, 216, 218, 220. Furthermore, the present disclosure contemplates that the network environment 100 may include any number of redundant network ports at any network level based upon the intended application of the network environment.

The redundant network port (e.g., the redundant input network port 212 and/or the redundant output network port 222) may initially be inoperable, inactive, dormant, or otherwise not operatively coupled with an active/operable network port. In this way, for example, the redundant input network port 212 may provide a backup or alternative network port for any plurality of input network ports 204, 206, 208, 210 in communication with the intermediate network switch 202. For example, if input network port INP_0 202 malfunctions, the redundant input network port 212 may replace the malfunctioning input network port INP_0 202. In some embodiments, the number of redundant network ports may indicate the number of network ports that could be offline at a given time without network interruption.

Similarly, for example, the redundant output network port 222 may provide a backup or alternative network port for any of the plurality of output network ports 214, 216, 218, 220 in communication with the intermediate network switch 202. For example, if the output network port ONP_0 212 malfunctions, the redundant output network port 222 may replace the malfunctioning output network port ONP_0 212. The redundant network ports described herein may operate similar to the plurality of input network ports 204, 206, 208, 210, and the plurality of output network ports 214, 216, 218, 220, and may include any networking component or device, such as a switch, a server, a network interface controller (NIC), a networking card, a host, and/or the like.

In some embodiments, the intermediate network switch 202, the plurality of input network ports 204, 206, 208, 210, the plurality of output network ports 214, 216, 218, 220, the redundant input network port 212, and the redundant output network port 222 may be part of a leaf-spine network architecture. A leaf-spine architecture is a data center network topology that may include two switching layers—a spine layer and a leaf layer. The leaf layer may include access switches (leaf switches) that aggregate traffic from servers and connect directly into the spine or network core. Spine switches interconnect all leaf switches in a full-mesh topology between access switches in the leaf layer and the servers from which the access switches aggregate traffic. As such, in one embodiment, the plurality of input network ports 204, 206, 208, 210 and the redundant input network port 212 may be spine switches, and the plurality of output network ports 214, 216, 218, 220 and the redundant input network port 212, and the redundant output network port 222 may be leaf switches.

Figure 1B:
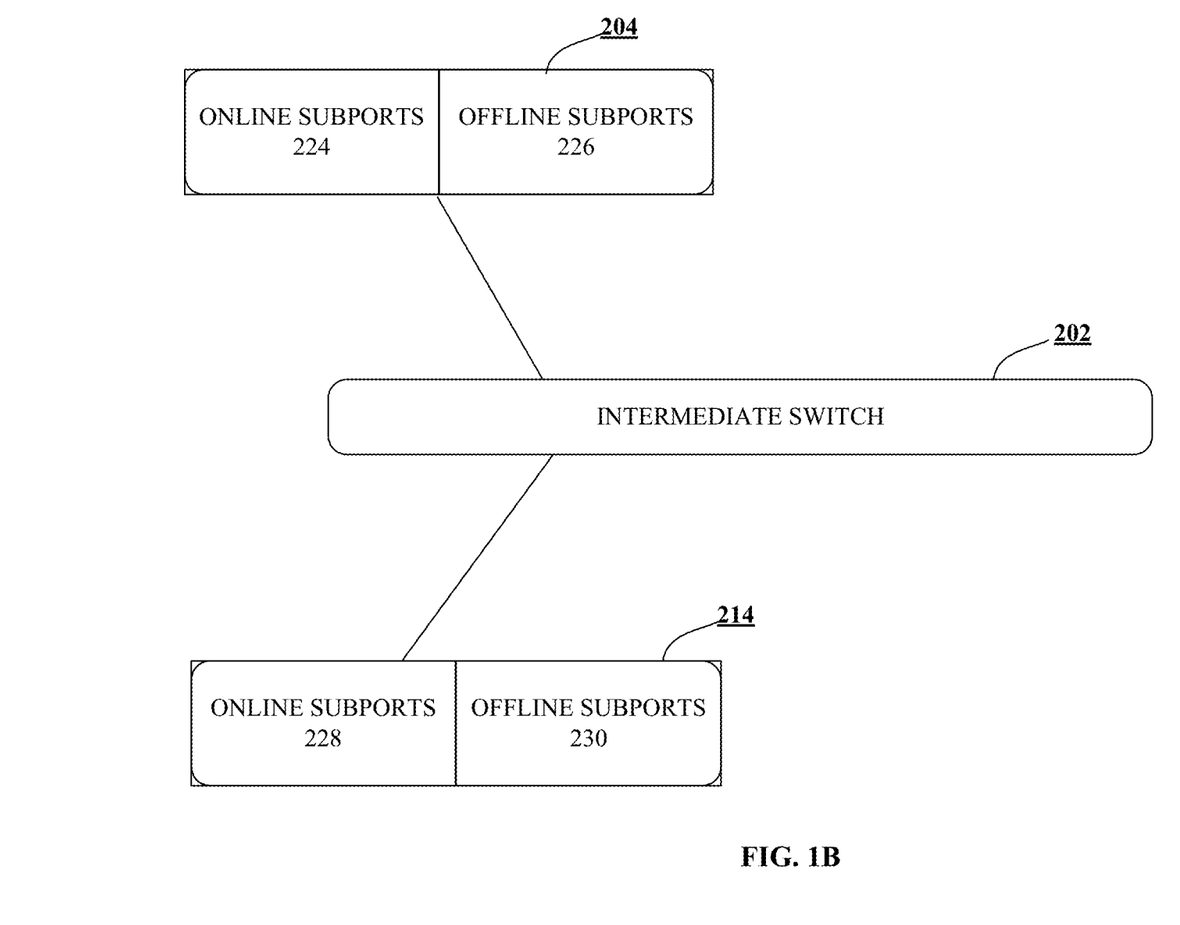
FIG. 1B illustrates an example network port configuration, in accordance with various embodiments of the present disclosure.

FIG. 1B illustrates example network port configuration including various subports. In addition to or as an alternative to the resiliency offered by the redundant input network port 212 and/or the redundant output network port 222, the plurality of input network ports 204, 206, 208, 210 and/or the plurality of output network ports 214, 216, 218, 220 may leverage redundant subports to provide resiliency.

For example, as shown in FIG. 1B, a first input network port 204 may include a plurality of subports 224, 226, and at least a portion of these subports 224 may be online or otherwise operational to transmit data. Similarly, a first output network port 214 may include a plurality of subports 228, 230, and at least a portion of these subports 228 may also be online or otherwise operational to transmit data. Although illustrated in FIG. 1B with only a first input network port 204 and a first output network port 214, the present disclosure contemplates that any of the network ports described herein may include any number of subports based upon the intended application of the associated system. Furthermore, although illustrated with a first input network port 204 and a first output network port 214 at different network levels, the present disclosure contemplates that network ports at any network level may leverage the redundant subports described herein.

As described herein, the system may include any number of network ports that may be communicably coupled to one another. In the simplified illustration of FIG. 1B, the first input network port 204 may be in communication with the first output network port 214 via the online subports 224 and the online subports 228 of these respective network ports 204, 214 in an instance in which each of these subports 224, 228 are operable. As described above, instances may occur in which either of the network ports malfunction, are subjected to maintenance, or are otherwise offline or inoperable. For example, one or more of the online subports 224 of the first input network port 204 or one or more of the online subports 228 of the first output network port 214 may malfunction such that a prior communication link between the online subports 224 of the first input network port 204 and the online subports 228 of the first output network port 214 is severed, terminated, diminished, etc.

In order to provide resilience to the system in the event that at least one of the online subports 224 (e.g., any portion of the plurality of subports that is currently operational) malfunctions (e.g., device failure, maintenance, etc.), the first input network port 204 may include one or more redundant or offline subports (e.g., offline subport(s) 226). The offline subports 226 of the first input network port 204 may be inoperable, inactive, dormant, or otherwise not communicably coupled with an active/operable network port or subport. In this way, for example, the offline or redundant subport 226 may provide a backup or alternative network subport for any of the other of the plurality of subports of the first input network port 204. For example, if one or more of the online subports 224 malfunctions, the redundant or offline subports 226 may replace the malfunctioning subport of the first input network port 204. In some embodiments, the number of redundant or offline subports 226 may indicate the number of network subports of the first input network port 204 that could be offline at a given time without network interruption. In some embodiments, the redundant or offline subports 226 may be substantially identical to the online subports 224 (e.g., the remainder of the plurality of subports of the first input network port 204).

In order to provide resilience to the system in the event that at least one of the online subports 228 (e.g., portion of the first plurality of subports that is currently operational) malfunctions (e.g., device failure, maintenance, etc.), the first output network port 214 may include one or more redundant or offline subports (e.g., offline subport(s) 230). The offline subports 230 of the first output network port 214 may be inoperable, inactive, dormant, or otherwise not communicably coupled with an active/operable network port or subport. In this way, the offline or redundant subport 230 may similarly provide a backup or alternative network subport for any of the other of the plurality of subports of the first output network port 214. For example, if one or more of the online subports 228 malfunctions, the redundant or offline subports 230 may replace the malfunctioning subport of the first output network port 214.

Example System Circuitry

Figure 1C:
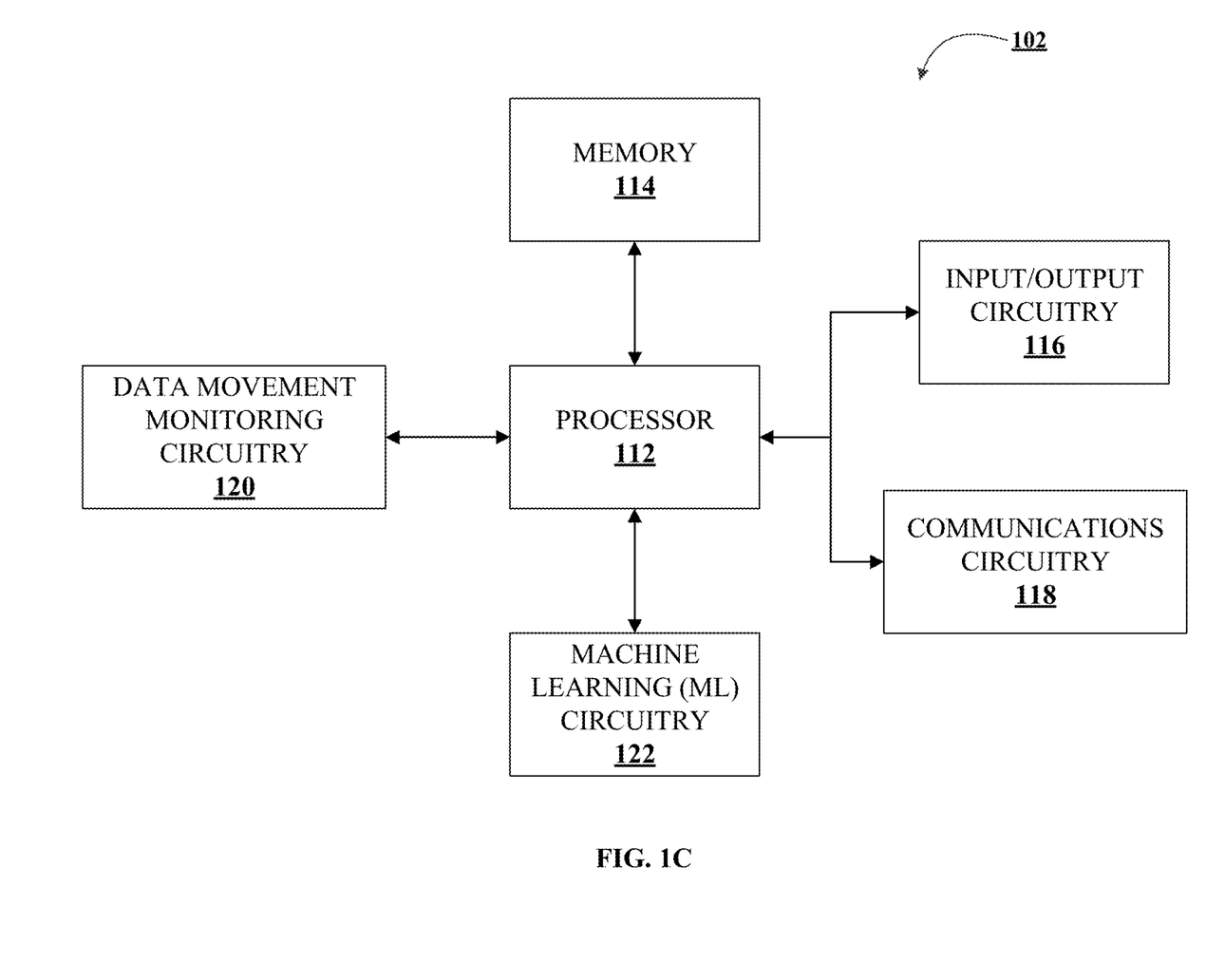
FIG. 1C illustrates an example block diagram of a system for use with various embodiments of the present disclosure.

FIG. 1C illustrates a schematic block diagram of example circuitry, some, or all of which may be included in the system 102. As shown in FIG. 1C, the system 102 may include a processor 112, a memory 114, input/output circuitry 116, communications circuitry 118, data movement monitoring circuitry 120, and machine learning (ML) circuitry 122. As described herein, in some examples, the system 102 may include, in whole or in part, the intermediate switch and/or the intermediate switch 202 may include, in whole or in part, the system 102.

Although the term "circuitry" as used herein with respect to components 112-122 is described in some cases using functional language, it should be understood that the particular implementations necessarily include the use of particular hardware configured to perform the functions associated with the respective circuitry as described herein. It should also be understood that certain of these components 112-122 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the system 102 may be housed within this device, while other components are housed within other devices (e.g., a controller in communication with the system 102).

While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the switch 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or coprocessor or any other processing circuitry assisting or otherwise associated with the processor) may be in communication with the memory 114 via a bus for passing information among components of, for example, the system 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., system 102, to carry out various functions in accordance with example embodiments of the present disclosure.

Although illustrated in FIG. 1C as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the system 102 to carry out various functions in accordance with example embodiments discussed herein. For example, in at least some embodiments, the memory 114 is configured to buffer data for processing by the processor 112. Additionally, or alternatively, in at least some embodiments, the memory 114 is configured to store program instructions for execution by the processor 112. The memory 114 may store information in the form of static and/or dynamic information. This stored information may be stored and/or used by the system 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 1C as a single processor, in some embodiments, the processor 112 may include a plurality of processors. The plurality of processors may be embodied on a single computing device or may be distributed across a plurality of such devices collectively configured to function as the system 102. The plurality of processors may be in operative communication with each other and may be collectively configured to perform one or more functionalities of the system 102 as described herein.

In an example embodiment, the processor 112 is configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure processor 112 to perform one or more algorithms and/or operations described herein when the instructions are executed. For example, these instructions, when executed by processor 112, may cause the system 102 to perform one or more of the functionalities thereof as described herein.

In some embodiments, the system 102 further includes input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. Input/output circuitry 116 may include a user interface and may include a web user interface, a mobile application, a kiosk, or the like. The input/output circuitry 116 may be used by a user to view and/or adjust likelihood of malfunction indications (e.g., a user may indicate whether a malfunction has been resolved).

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the system 102 may be implemented as an end-user machine or other type of device designed for complex user interactions. In some embodiments (like other components discussed herein), the input/output circuitry 116 may be eliminated from the system 102. The input/output circuitry 116 may be in communication with memory 114, communications circuitry 118, and/or any other component(s), such as via a bus. Although more than one input/output circuitry and/or other component can be included in the system 102, only one is shown in FIG. 1C to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the intermediate network switch. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna(e) or to handle receipt of signals received via the antenna(e). These signals may be transmitted by the system 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of system 102, such as via a bus. The communication circuitry 118 of the system 102 may also be configured to receive and transmit information with the various network ports discussed herein.

The data movement monitoring circuitry 120, in some embodiments, captures and analyzes network traffic, including any data movement across the plurality of input network ports 204, 206, 208, 210 and the plurality of output network ports 214, 216, 218, 220. To this end, the data movement monitoring circuitry 120, for example, may capture data movement between the plurality of input network ports 204, 206, 208, 210 and the intermediate network switch 202, and between the intermediate network switch 202 and the plurality of output network ports 214, 216, 218, 220. The captured data movement is then used to determine network performance indicators, such as a memory size and usage, response time, average latency, error rate, requests per second, throughput, and/or the like. The ML circuitry 122, in some embodiments, may use the network performance indicators and the operational status of each network port to preemptively identify network ports that are likely to malfunction (or fail).

In some embodiments, the system 102 includes hardware, software, firmware, and/or a combination of such components, configured to support various aspects of data movement monitoring and machine learning implementations as described herein. It should be appreciated that in some embodiments, the data movement monitoring circuitry 120 and the ML circuitry 122 may perform one or more of such example actions in combination with another circuitry of the system 102, such as the memory 114, processor 112, input/output circuitry 116, and communications circuitry 118. For example, in some embodiments, the data movement monitoring circuitry 120 and/or the ML circuitry 122 utilizes processing circuitry, such as the processor 112 and/or the like, to form a self-contained subsystem to perform one or more of its corresponding operations. In a further example, and in some embodiments, some or all of the functionality of the data movement monitoring circuitry 120 and/or the ML circuitry 122 may be performed by processor 112. In this regard, some or all of the example processes and algorithms discussed herein can be performed by at least one processor 112, the data movement monitoring circuitry 120, and/or the ML circuitry 122. It should also be appreciated that, in some embodiments, the data movement monitoring circuitry 120, and/or the ML circuitry 122 may include a separate processor, specially configured field programmable gate array (FPGA), or application specific interface circuit (ASIC) to perform its corresponding functions.

Additionally, or alternatively, in some embodiments, the data movement monitoring circuitry 120, and/or the ML circuitry 122 use the memory 114 to store collected information. For example, in some implementations, the data movement monitoring circuitry 120, and/or the ML circuitry 122 includes hardware, software, firmware, and/or a combination thereof, that interacts with the memory 114 to send, retrieve, update, and/or store data.

Accordingly, non-transitory computer readable storage media can be configured to store firmware, one or more application programs, and/or other software, which include instructions and/or other computer-readable program code portions that can be executed to direct operation of the system 102 to implement various operations, including the examples shown herein. As such, a series of computer-readable program code portions may be embodied in one or more computer-program products and can be used, with a device, system 102, database, and/or other programmable apparatus, to produce the machine-implemented processes discussed herein. It is also noted that all or some of the information discussed herein can be based on data that is received, generated and/or maintained by one or more components of the system 102. In some embodiments, one or more external systems (such as a remote cloud computing and/or data storage system) may also be leveraged to provide at least some of the functionality discussed herein.

Example ML Methods for Network Resilience and Steering

Figure 2:
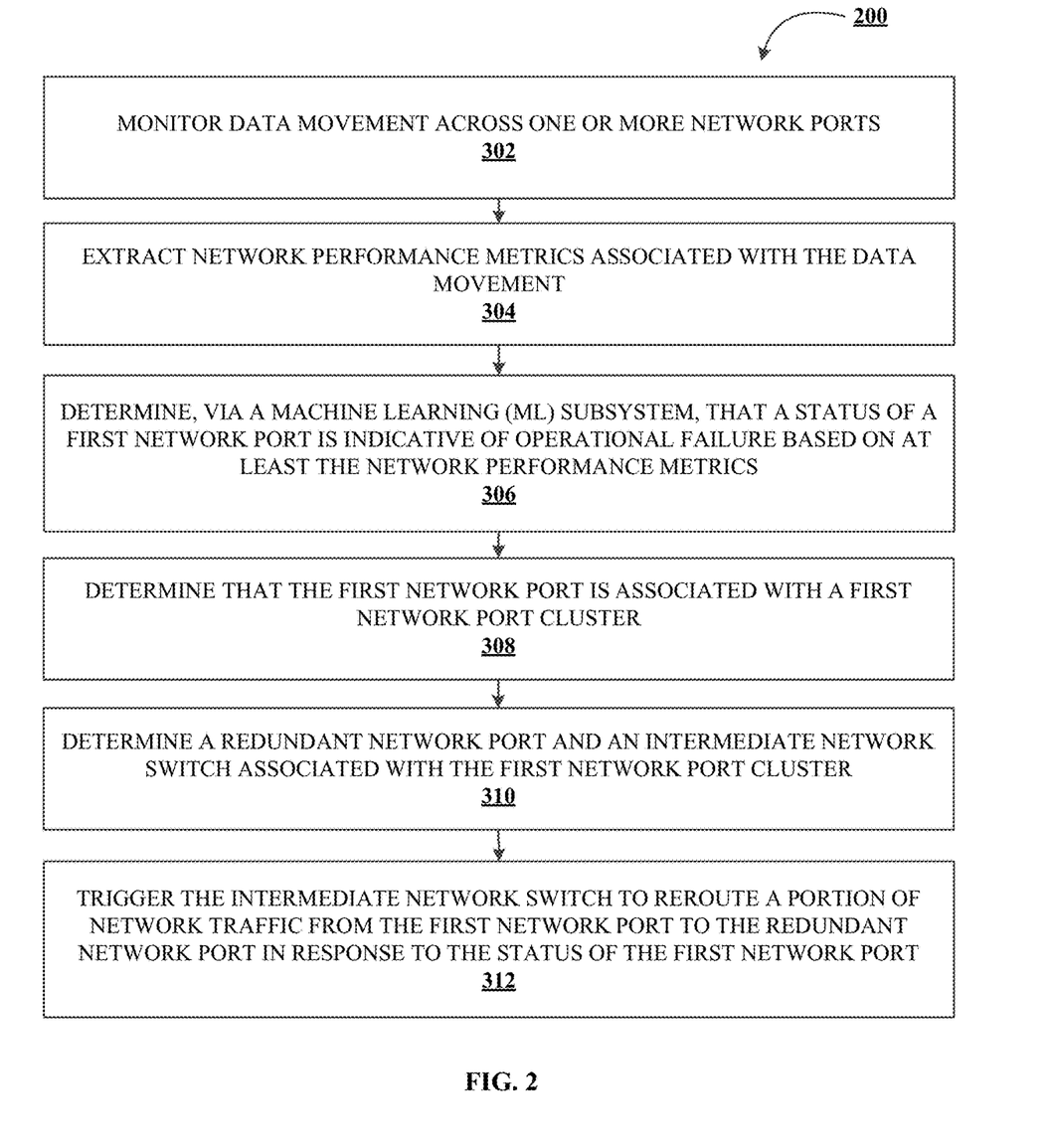
FIG. 2 illustrates an example machine learning (ML) based method for network resilience and steering, in accordance with an embodiment of the present disclosure.

FIG. 2 illustrates a process flow for a machine learning (ML) based system for network resilience and steering 200. As shown in block 302, the process flow includes monitoring data movement across one or more network ports. In some embodiments, monitoring data movement may include collecting, storing, and analyzing network traffic across the network environment in real-time or near real-time. Monitoring data movement provides valuable insight into network uptime and availability, visibility into various network components (e.g., network ports), network performance, capacity planning, network security, and/or the like.

In some embodiments, prior to monitoring the data movement, the system may supply a stimulus to the network environment to determine a network response to the stimulus as part of a network performance test. The type of stimulus applied to the network environment may depend on the type of the network performance test. Network performance tests may include vulnerability testing, penetration testing, specific network tests such as wireless network penetration testing, application security testing, peak load testing, and/or the like. As such, the type of the network performance test often determines the type of stimulus that is to be applied to the network environment.

Next, as shown in block 304, the process flow includes extracting network performance indicators associated with the data movement. In some embodiments, network performance indicators may be measurable outputs capable of capturing performance of each network port in the network environment at any time instant. In one aspect, the network performance indicators may depend on the type of the network performance test and the type of stimulus applied to the network environment. In one example, network performance indicators for vulnerability testing may include a status of firewall configurations, a software version determination, authentication requirements, and/or the like. In another example, network performance indicators for penetration testing may include processing times associated with processing past requests, dependencies associated with the network resources, type of requests previously processed, tolerance of the network resources, average number of requests processed at any particular time instant, and/or the like. Other examples of network performance indicators may include a memory size and usage, response time, average latency, error rate, requests per second, throughput, and/or the like.

Next, as shown in block 306, the process flow includes determining, via a machine learning (ML) subsystem, that a status of a first network port is indicative of operational failure based on at least the network performance indicators. To this end, in some embodiments, the system may deploy, via the ML subsystem, a trained ML model on the network performance metrics. A trained ML model may refer to a mathematical model generated by machine learning algorithms based on training data, to make predictions or decisions without being explicitly programmed to do so. To train the ML model, the system may monitor data movement in the network environment for a particular amount of time (e.g., a second time period) and extract network performance indicators associated with the data movement at periodic time intervals. In addition, at each periodic time interval, the system may determine the status of network ports in the network environment. The network performance indicators and the status of the network ports are then used as training data to train the ML model.

The ML model represents what was learned by the selected machine learning algorithm and represents the rules, numbers, and any other algorithm-specific data structures required for decision-making. Selecting the right machine learning algorithm may depend on a number of different factors, such as the problem statement and the kind of output needed, type and size of the data, the available computational time, number of features and observations in the data, and/or the like. ML algorithms may refer to programs that are configured to self-adjust and perform better as they are exposed to more data. To this extent, ML algorithms are capable of adjusting their own parameters, given feedback on previous performance in making predictions about a dataset.

The ML algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML model may be trained using repeated execution cycles of experimentation, testing, and tuning to modify the performance of the ML algorithm and refine the results in preparation for deployment of those results for consumption or decision making. The ML model may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model is the measurement used to determine which set of hyperparameters is best at identifying relationships and patterns between variables in a dataset based on the input, or training data. A fully trained ML model is one whose hyperparameters are tuned and model accuracy maximized.

When deployed, the trained ML model may be used to determine a likelihood of failure for each network port (e.g., first network port). In some embodiments, in response to determining the likelihood of failure for each network port, the system may compare the likelihood of failure with a failure threshold. If the likelihood of failure for a network port (e.g., first network port) meets the failure threshold, it is an indication that the network port is likely to fail, malfunction, need maintenance, and/or any other reason(s) that the network port is going to (or currently is) offline, inoperable, inactive, etc.

Next, as shown in block 308, the process flow includes determining that the first network port is associated with a first network port cluster. In some embodiments, a network environment may include one or more network port clusters, with each network port cluster having a plurality of network input ports (e.g., plurality of input network ports 204, 206, 208, 210), network output ports (e.g., plurality of output network ports 214, 216, 218, 220), intermediate network switches (e.g., intermediate network switch 202), and redundant network ports (e.g., a redundant input network port 212 and a redundant output network port 222). In specific embodiments, when monitoring data movement in the network environment, the system may monitor data movement across network ports within a specific network port cluster, which includes monitoring data movement across each network port (including the intermediate switch) in the network port cluster. In such cases, when supplying a stimulus, the system may supply a stimulus only to the particular network port cluster under consideration.

Next, as shown in block 310, the process flow includes determining a redundant network port and an intermediate network switch associated with the first network port cluster. By identifying the network port cluster (e.g., first network port cluster) associated with the network port (e.g., first network port), the system may identify the intermediate network switch associated with the network port. As described herein, each intermediate network switch may include redundant network ports that may remain offline, dormant, or otherwise inoperable. Furthermore, in some embodiments, one or more of the network ports may include subports that are redundant (e.g., offline, dormant, or otherwise inoperable) to provide port resilience.

Next, as shown in block 312, the process flow includes triggering the intermediate network switch to reroute a portion of network traffic from the first network port to the redundant network port in response to the status of the first network port. As described herein, a redundant input network port (e.g., redundant input network port 212) may operate to provide resiliency for an input network port (e.g., any of the plurality of input network ports 204, 206, 208, 210), and the redundant output network port (e.g., redundant output network port 222) may operate to provide resiliency for an output network port (e.g., any of the plurality of output network ports 214, 216, 218, 220). Also, as described herein, a singular redundant network port (e.g., the redundant input network port 212 or the redundant output network port 222) may be leveraged by both the plurality of input network ports 204, 206, 208, 210, and the plurality of output network ports 214, 216, 218, 220 for resiliency.

Rerouting the portion of the network traffic from the first network port to the redundant network port allows for any malfunction (or potential malfunction) to be addressed. In some embodiments, the malfunction (or potential malfunction) associated with the first network port may need an active resolution requiring intervention, including determining that the indication of malfunction was unnecessary, repairing any malfunctions, replacing the first network port, preforming any maintenance on the first network port, and/or the like. In one aspect, to address the malfunction (or potential malfunction) associated with the first network port, the system may trigger the intermediate network switch to terminate a communication link to the first network port and establish a communication link to the redundant network port. Once the malfunction has been resolved, the system may trigger the intermediate network switch to terminate the communication link to the redundant network port and re-establish the communication link with the first network port. In response, the system may trigger the intermediate network switch to reroute the portion of the network traffic from the redundant network port back to the first network port.

In some other embodiments, the malfunction (or potential malfunction) may not require an active resolution. For example, the potential malfunction may be due to a temporary data overload at the first network port that is likely to result in a bottleneck throttling the network performance. In such cases, rerouting the portion of the network traffic from the first network port to a redundant network port may, in some instances, allow the bottleneck to resolve itself. In such cases, the system may monitor data movement across the network ports for a particular time period (e.g., first time period) after triggering the rerouting of the portion of network traffic from the first network port to the redundant network port. During this time, the system may determine the likelihood of failure for the first network port using the trained ML model. If the likelihood of failure for the first network port falls below the failure threshold, then the system may trigger the intermediate network switch to reroute the portion of network traffic from the redundant network port back to the first network port.

In some embodiments, rerouting a portion of network traffic at block 312 may include rerouting a portion of network traffic directed to a previously online subport (e.g., online subport 224) to a redundant or previously offline subport (e.g., offline subport 226). As described herein, a redundant subport that is supported by respective input ports may operate to provide resiliency for an input network port (e.g., any of the plurality of input network ports 204, 206, 208, 210), and a redundant subport that is supported by respective output ports may operate to provide resiliency for an output network port (e.g., any of the plurality of output network ports 214, 216, 218, 220). Furthermore, the system of the present disclosure may operate to determine a particular type of resilience operations in response to the status of the first network port. For example, the status of the first network port may, in some embodiments, cause the intermediate network switch to reroute network traffic to a redundant switch. In other embodiments, the status of the first network port may cause the intermediate network switch to reroute network traffic to a redundant network subport. In other words, the systems described herein may operate to dynamically leverage resilience at the network port and subport level in response to the varying malfunctions, maintenance operations, etc. experienced by the system.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A machine learning (ML) based system for network resilience and steering comprising:
a non-transitory storage device; and
a processor coupled to the non-transitory storage device, wherein the processor is to:
monitor data movement across one or more network ports;
extract network performance indicators associated with the data movement;
determine, via a machine learning (ML) subsystem, a likelihood of failure for an operational first network port based on at least the network performance indicators;
determine that a status of the first network port is indicative of operational failure in an instance in which the likelihood of failure for the first network port satisfies a failure threshold;
determine that the first network port is associated with a first network port cluster;
determine a redundant network port and an intermediate network switch associated with the first network port cluster;
trigger the intermediate network switch to reroute a portion of network traffic from the first network port to the redundant network port in response to the status of the first network port, by terminating a communication link to the first network port; and
re-trigger the intermediate switch to reroute the portion of network traffic back to the first network port upon detecting recovery of the first network port, by re-establishing the communication link.

2. The system of claim 1, wherein, in determining that the status of the first network port is indicative of operational failure, the processor is to:
deploy, via the ML subsystem, a trained ML model on the network performance indicators extracted from the data movement; and
determine, using the trained ML model, the likelihood of failure for the first network port.

3. The system of claim 2, wherein the processor is to:
monitor data movement across the one or more network ports for a first time period after triggering the rerouting of the portion of network traffic from the first network port to the redundant network port;
determine, using the trained ML model, the likelihood of failure for the first network port; and
trigger the intermediate network switch to reroute the portion of network traffic from the redundant network port to the first network port in an instance in which the likelihood of failure of the first network port fails to satisfy the failure threshold.

4. The system of claim 3, wherein, in triggering the intermediate network switch to reroute the portion of network traffic from the redundant network port to the first network port, the processor is to trigger the intermediate network switch to terminate a communication link to the redundant network port.

5. The system of claim 1, wherein the processor is to:
monitor data movement across the one or more network ports for a second time period;
extract the network performance indicators associated with the data movement for the second time period;
determine the status of the one or more network ports during the second time period;
generate a feature set using the network performance indicators and the status of the one or more network ports; and
train, using the ML subsystem, an ML model using the feature set to generate the trained ML model.

6. The system of claim 1, wherein, prior to monitoring the data movement, the processor is to supply a stimulus to the first network port cluster.

7. A computer program product for machine learning (ML) based network resilience and steering, the computer program product comprising a non-transitory computer-readable medium comprising code causing an apparatus to:
monitor data movement across one or more network ports;
extract network performance indicators associated with the data movement;
determine, via a machine learning (ML) subsystem, a likelihood of failure for an operational first network port based on at least the network performance indicators;
determine that a status of the first network port is indicative of operational failure in an instance in which the likelihood of failure for the first network port satisfies a failure threshold;
determine that the first network port is associated with a first network port cluster;
determine a redundant network port and an intermediate network switch associated with the first network port cluster;
trigger the intermediate network switch to reroute a portion of network traffic from the first network port to the redundant network port in response to the status of the first network port, by terminating a communication link to the first network port; and
re-trigger the intermediate switch to reroute the portion of network traffic back to the first network port upon detecting recovery of the first network port, by re-establishing the communication link.

8. The computer program product of claim 7, wherein, in determining that the status of the first network port is indicative of operational failure, the apparatus is to:
deploy, via the ML subsystem, a trained ML model on the network performance indicators extracted from the data movement; and
determine, using the trained ML model, the likelihood of failure for the first network port.

9. The computer program product of claim 8, wherein the apparatus is to:
monitor data movement across the one or more network ports for a first time period after triggering the rerouting of the portion of network traffic from the first network port to the redundant network port;
determine, using the trained ML model, the likelihood of failure for the first network port; and
trigger the intermediate network switch to reroute the portion of network traffic from the redundant network port to the first network port in an instance in which the likelihood of failure of the first network port fails to satisfy the failure threshold.

10. The computer program product of claim 9, wherein, in triggering the intermediate network switch to reroute the portion of network traffic from the redundant network port to the first network port, the apparatus is to trigger the intermediate network switch to terminate a communication link to the redundant network port.

11. The computer program product of claim 7, wherein the apparatus is to:

monitor data movement across the one or more network ports for a second time period;
extract the network performance indicators associated with the data movement for the second time period;
determine the status of the one or more network ports during the second time period;
generate a feature set using the network performance indicators and the status of the one or more network ports; and
train, using the ML subsystem, an ML model using the feature set to generate the trained ML model.

12. The computer program product of claim 7, wherein, prior to monitoring the data movement, the apparatus is to supply a stimulus to the first network port cluster.

13. A method for machine learning (ML) based network resilience and steering, the method comprising:
monitoring data movement across one or more network ports;
extracting network performance indicators associated with the data movement;
determining, via a machine learning (ML) subsystem, a likelihood of failure for an operational first network port based on at least the network performance indicators;
determining that a status of the first network port is indicative of operational failure in an instance in which the likelihood of failure for the first network port satisfies a failure threshold;
determining that the first network port is associated with a first network port cluster;
determining a redundant network port and an intermediate network switch associated with the first network port cluster; and
triggering the intermediate network switch to reroute a portion of network traffic from the first network port to the redundant network port in response to the status of the first network port, by terminating a communication link to the first network port; and
re-triggering the intermediate switch to reroute the portion of network traffic back to the first network port upon detecting recovery of the first network port, by re-establishing the communication link.

14. The method of claim 13, wherein determining that the status of the first network port is indicative of operational failure further comprises:
deploying, via the ML subsystem, a trained ML model on the network performance indicators extracted from the data movement; and
determining, using the trained ML model, the likelihood of failure for the first network port.

15. The method of claim 14, further comprising:
monitoring data movement across the one or more network ports for a first time period after triggering the rerouting of the portion of network traffic from the first network port to the redundant network port;
determining, using the trained ML model, the likelihood of failure for the first network port; and
triggering the intermediate network switch to reroute the portion of network traffic from the redundant network port to the first network port in an instance in which the likelihood of failure of the first network port fails to satisfy the failure threshold.

16. The method of claim 13, wherein triggering the intermediate network switch to reroute the portion of network traffic from the redundant network port to the first network port further comprises triggering the intermediate network switch to terminate a communication link to the redundant network port.

17. The method of claim 13, further comprising:
monitoring data movement across the one or more network ports for a second time period;
extracting the network performance indicators associated with the data movement for the second time period;
determining the status of the one or more network ports during the second time period;
generating a feature set using the network performance indicators and the status of the one or more network ports; and
training, using the ML subsystem, an ML model using the feature set to generate the trained ML model.

18. The system of claim 1, wherein the first network port is operational during the determination of the likelihood of failure for the first network port based on at least the network performance indicators.

19. The computer program product of claim 7, wherein the first network port is operational during the determination of the likelihood of failure for the first network port based on at least the network performance indicators.

20. The method of claim 13, wherein the first network port is operational during the determination of the likelihood of failure for the first network port based on at least the network performance indicators.

* * * * *